ial application Ser. No. 185,389, Apr. 5, 1962, which is a continuation-in-part of application Ser. No. 807,749, Apr. 21, 1959, now abandoned. This application Sept. 15, 1969, Ser. No. 871,406
Int. Cl. C01b 21/52, 25/10
U.S. Cl. 23—357                          3 Claims

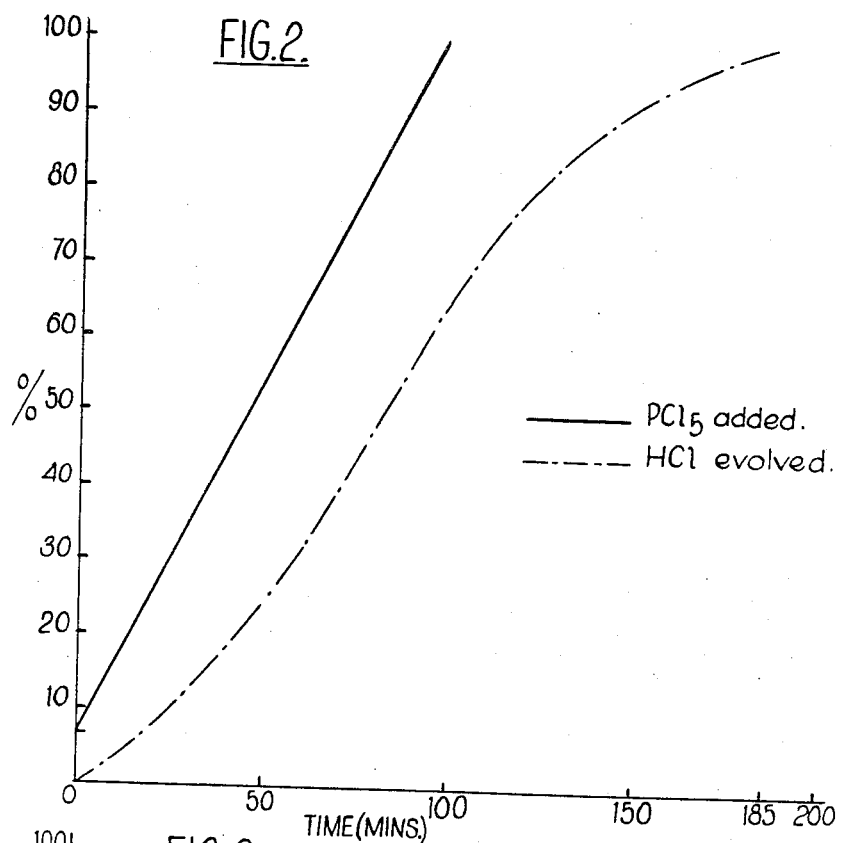
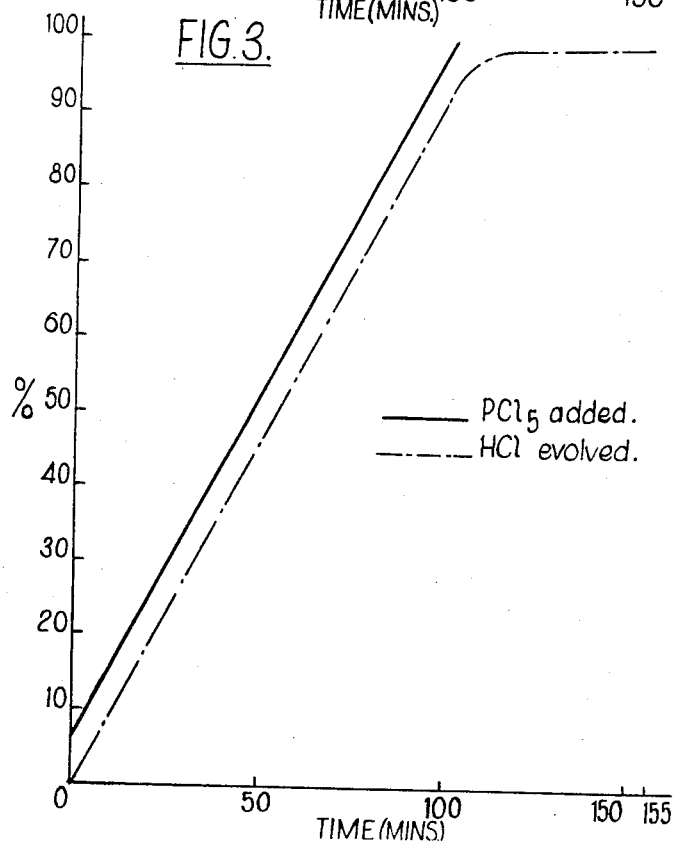

ABSTRACT OF THE DISCLOSURE

In the production of phosphonitrilic chlorides by the reaction of phosphorus pentachloride and ammonium chloride in an inert solvent the proportion of trimeric phosphonitrilic chloride is greatly increased by adding at least a major proportion of the phosphorus pentachloride to the ammonium chloride slowly and evenly during a period of time corresponding to about 50 to about 100 percent of the total time during which the reaction takes place.

REFERENCE TO PRIOR APPLICATIONS

Figure 1:
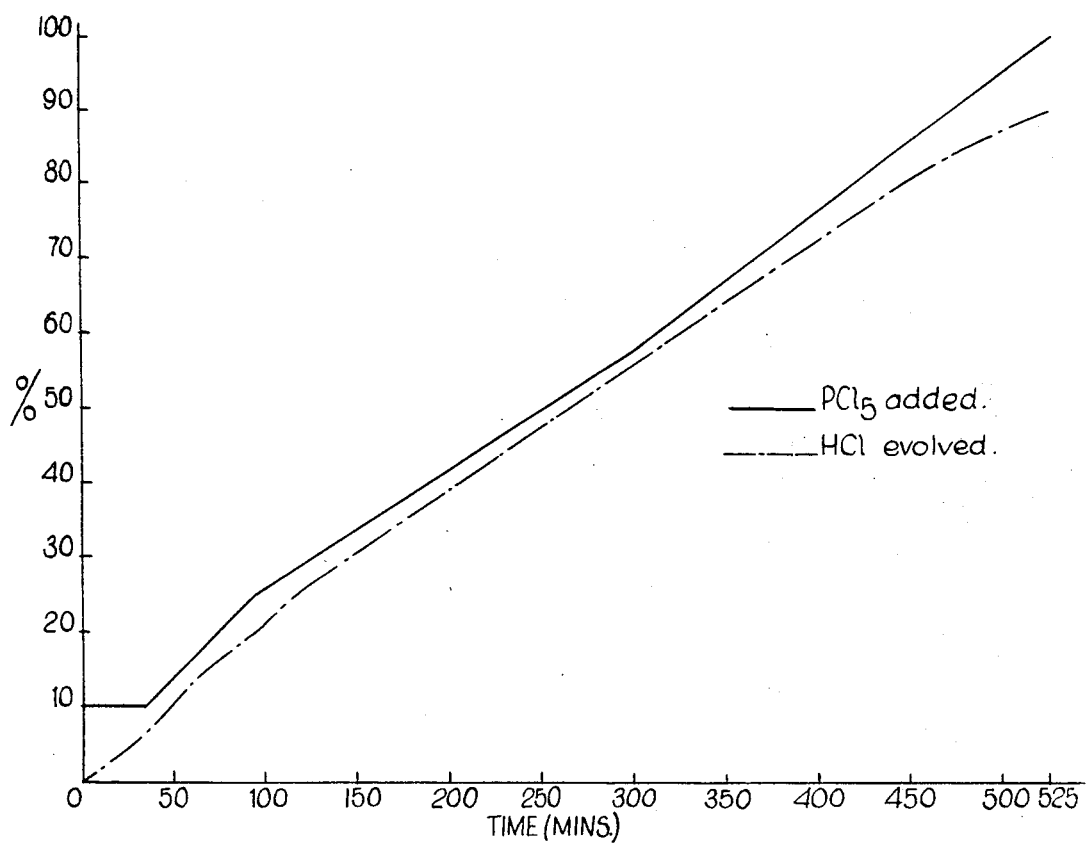

This is a continuation-in-part of our copending application Ser. No. 185,389, filed Apr. 5, 1962, now abandoned which was a continuation-in-part of application Ser. No. 807,749, filed Apr. 21, 1959, now abandoned.

This invention is for improvements in or relating to a method of manufacture of phosphonitrilic chloride polymers whereby a high yield of the lower cyclic phosphonitrilic chloride polymers is produced.

The formation of polymeric phosphonitrilic chlorides has been described in "Berichte" 57B 1343 (1924) by Schenk and Romer. The method of formation described is the reaction of phosphorus pentachloride with ammonium chloride. This reaction is brought about by refluxing the two compounds in an inert solvent, the solvent used being tetrachloroethane. Other solvents which have been used are chlorobenzene, orthodichlorobenzene and benzyl chloride. After reflux and when the reaction has proceeded substantially to completion, a mixture of polymers is obtained, this mixture consisting of (a) cyclic phosphonitrilic chloride polymers, $(PNCl_2)_n$, where $n$ is an integer of 3 or more and (b) linear $PNCl_2$ chains end-blocked with the elements of phosphorus pentachloride and of the probable formula $(PNCl_2)_nPCl_5$.

Typical proportions, expressed as percentages by weight, of the two types of polymer obtained by this method, are 75–85% of the cyclic polymers and 15–25% of the linear polymers of general formula $(PNCl_2)_nPCl_5$, wherein $n$ is an integer of 5 or more. Furthermore, the proportions of the individual cyclic polymers found in the crude mixture of cyclic and linear polymers are approximately 25–35% of the trimer $(PNCl_2)_3$, 10–20% of the tetramer $(PNCl_2)_4$ and 30–40% of the higher cyclic polymers, the percentages of the various polymers being expressed as percentages by weight. Yields of the crude mixture are generally of the order of 95–99% based on the $PCl_5$ used. The proportions of the two types of polymer may be varied to some extent by varying the amount of phosphorus pentachloride and ammonium chloride used. It has been proposed to improve the yield of cyclic polymers by adding quinoline, but we have found that, in fact, this has no effect.

Attempts have also been made to produce polymeric phosphonitrilic chlorides by reacting phosphorus pentachloride with ammonia instead of with ammonium chloride, but the main products of such reaction are fully amidated phosphonitrilic compounds, only small quantities of phosphonitrilic chlorides being produced (see Audrieth et al., Chemical Reviews, vol. 32, page 112). Moreover, phosphonitrilic chloride itself reacts with ammonia to give partially and fully amidated products (see Chemical Reviews, vol. 32 pages 125–127). A prior proposal to react liquid ammonia with phosphorus pentachloride results in the production of a mixture consisting predominantly of ammonium chloride, fully amidated phosphonitrilic rings $[PN(NH_2)_2]_n$ and degradation products thereof such as phospham, not more than about 1–2% of the product being cyclic phosphonitrilic chloride polymers. The phosphorus pentachloride must be added to the liquid ammonia not all at once, but in small portions, distributed over the first part of the entire reaction time, because the reaction between these two reactants is, particularly initially, quite violent, and is accompanied by evaporation of considerable quantities of ammonia. The very low yield of about 2% of cyclic phosphonitrilic chloride polymers is reported to consist essentially of a mixture of trimer and tetramer.

Cyclic phosphonitrilic chloride polymers are valuable, for example, as constituents of thermally resistant resins as disclosed more fully in U.S. Pat. No. 2,866,773 and as intermediates for insecticidally active compounds as disclosed more fully in U.S. Pat. No. 2,858,306. As is already known, the trimer is the most useful for these purposes. The trimer is of particular value for use in reactions with phenolic compounds to produce resins, since the higher polymers may give rise to too great a degree of cross-linking. Moreover, the trimer is the easiest of the cyclic polymers to separate in pure form.

An object of the present invention is to reduce the yield of linear phosphonitrilic chloride polymers and increase the yield of cyclic polymers, particularly the trimer, in the reaction between phosphorus pentachloride and ammonium chloride, and we have found that if at least the major part up to all or almost all, e.g., 90–100%, of the phosphorus pentachloride is added slowly over the major part of the time up to the whole period of time necessary to complete the reaction, we obtain a much greater yield of the cyclic trimer in the crude product than that which is produced when all the phosphorus pentachloride is added to the reaction mixture initially.

According to the invention, therefore, there is provided a process for the production of cyclic phosphonitrilic chloride polymers which comprises the addition of phosphorus pentachloride to at least an equi-molecular proportion of ammonium chloride in a hot solvent, at least the major part up to 90 to 100 percent of the phosphorus pentachloride being added slowly and evenly over the major part of the period of time up to the whole or substantially the whole period of time during which reaction takes place, whereby a high yield of lower cyclic polymers, especially the trimer, is produced.

We have further discovered that a high yield of cyclic phosphonitrilic chloride trimer is obtained if the rate of addition of phosphorus pentachloride to ammonium chloride in the presence of a hot solvent is controlled as a function of the theoretical rate of hydrogen chloride evolution occurring according to the equation:

$$3PCl_5 + 3NH_4Cl \rightarrow (PNCl_2)_3 + 12HCl$$

in such a manner that the mean hydrogen chloride evolution rate is from 40% to 100% of the theoretical rate, and is held as close as possible to the theoretical value.

In carrying out the invention, quinoline and like organic base catalysts should not be included in the reaction mixture since such materials do not favor the desired reaction. Moreover, they tend to contaminate the product and complicate its purification, as well as giving rise to unnecessary expense.

The phosphorus pentachloride may be added continuously or in small increments to the reaction mixture. Such increments should not average more than about 5% of the total phosphorus pentachloride reactant. In either case a first portion of phosphorus pentachloride may be initially present with the ammonium chloride in the reaction vessel. This first portion should preferably not be greater than 5–10% of the total phosphorus pentachloride used.

The speed of the reaction may be increased by adding a catalyst, as described for example in copending patent application Ser. No. 807,748, filed Apr. 21, 1959, now U.S. Pat. 3,575,102. Suitable catalysts are metal salts which form coordination complexes with ammonia or an amine, for example cobaltous chloride, aluminum chloride and cupric chloride. The reaction can also be accelerated by increasing the excess of ammonium chloride present or (as described below) by having ammonium chloride present in very finely divided form. In the absence of any of these expedients, the reaction is a slow one and its completion is asymptotic with respect to time. In such a case it is impracticable to extend the phosphorus pentachloride addition until the reaction is 100% complete. The time over which the addition extends should, however, not be less than 50% of the total time for which the reaction is continued, but preferably is more than about the first three quarters of the reaction time. This total time, where no expedients for accelerating the reaction are employed, is the same as in the conventional Schenk and Romer type of reaction and represents substantial (greater than 98%) completion of the reaction. The stage reached by the reaction at any time can readily be determined by collecting the hydrogen chloride evolved and estimating the total quantity evolved up to that time.

The reaction is carried out in a hot solvent which is inert to chlorination and boils between 100 degrees and 160 degrees centigrade. Preferred solvents are phosphorus oxychloride and halogenated hydrocarbons, preferably symmetrical tetrachloroethane, monochlorobenzene, orthodichlorobenzene or benzyl chloride. The temperature of the reaction is at least 100 degrees centigrade and is preferably the boiling point of the reaction mixture, the reaction being carried out under reflux.

In general, we have found that following three modes of operation most suitable for carrying out this invention:

In the first mode, a small quantity of the phosphorus pentachloride to be used, for example, up to 10 percent, and the total amount of the ammonium chloride are added to the solvent. This mixture is then heated to the boiling point of the solvent, and the refluxing solvent continuously passed back to the reaction mixture via a bed of the remaining bulk of the pentachloride. In this way, 90 percent or more of the phosphorus pentachloride is gradually extracted into the reactant mixture as the reaction is proceeding. The bed of pentachloride is extracted for several hours and the reaction is allowed to proceed for a short time after this, if necessary to complete the reaction. When the reaction is complete, the excess ammonium chloride is filtered off, the solvent removed from the filtrate and the crude product remains. A 92–99% yield of the crude product containing approximately 95–99% of the cyclic polymers is obtained.

In the second mode 90–95% to 100% of the calculated amount of phosphorus pentachloride is added to the solvent and the mixture heated until the chloride dissolves. This hot solution is then gradually added over a period of several hours to a slurry of a slight excess of the theoretical amount of ammonium chloride in a further quantity of the solvent, this mixture being under reflux at the boiling point of the solvent. For convenience, a small amount of the phosphorus pentachloride (say 5–10%) may be added initially to the ammonium chloride slurry. The mixture is allowed to reflux for a short time after all the phosphorus pentachloride has been added, if this is necessary to complete the reaction. By this method, a 92–100% yield of the crude product is obtained which contains 95–99% of cyclic polymers.

In the third mode, the progress of the reaction is checked by determining the HCl evolved at various stages, and this is used as a basis for regulating the rate of addition of the phosphorus pentachloride. The maximum theoretical HCl evolution rate is that which would occur if the $PCl_5$ reacted instantaneously upon addition to the reaction mixture and was immediately expelled from the reaction mixture. As the HCl evolution rate deviates farther from the maximum theoretical value, the yields of cyclic phosphonitrilic chloride and particularly the trimer diminish. It is believed that as the phosphorus pentachloride addition rate is increased for any given set of reaction conditions, such as particle size of ammonium chloride, etc. the available phosphorus pentachloride in the reaction solution is utilized too slowly and a resulting high concentration of phosphorus pentachloride in the reaction solution causes the formation of more linear phosphonitrilic chloride polymers. Control of the reaction can be achieved by regulating the rate of phosphorus pentachloride addition so that the actual rate of hydrogen chloride evolution is at least 40% of the theoretical hydrogen chloride evolution rate.

As indicated above, it is advantageous to use very finely divided ammonium chloride, since this accelerates the reaction at all stages. Preferred values for the specific surface of this material are greater than 1000 sq. cm./gm. In addition to or instead of this expedient it is also advantageous, for the purpose of accelerating the reaction, to use a substantial excess, for example a molecular excess of more than 10%, of ammonium chloride.

The following examples serve to illustrate the manner in which the invention may be carried into effect. In all the examples a crude mixture of linear and cyclic phosphonitrilic chloride polymer was produced and was worked up as follows: The crude mixture was first extracted with successive quantities (approximately 1 liter each) of warm petroleum ether (B.P. 40 degrees–60 degrees C.) until no further soluble material was extracted. This process dissolved out all the cyclic polymers which were then recovered as a semi-crystalline mixture by distilling the petroleum ether from the solution. The residual insoluble product was a mixture of linear phosphonitrilic chloride polymers which, after removal of any residual petroleum ether, was not analyzed further.

The mixture of cyclic polymers may be separated in various ways, among them:

(a) fractional distillation under reduced pressure as first described by Stokes in American Chem. J. (1897), 19, 782.

(b) fractional crystallization e.g. from petroleum ether or benzene.

(c) acid extraction as described in Pat. No. 3,008,799.

All three methods for separation of individual cyclic polymers are described in J. Chem. Soc. (1960), 2542 (L. G. Lund, N. L. Paddock, J. E. Proctor and H. T. Searle). The present invention is not concerned with these methods of separation, but only with the proportions of the various cyclic polymers present in the product. To ascertain these, we devised a method of analysis which takes advantage of the differences in infra-red spectra shown by individual cyclic polymers. These differences are indicated in papers by Daasch, J. Amer. Chem. Soc. (1954), 76, 3403; Krause, Z. Electrochem. (1955), 59, 1004 and Shaw, Chem. and Ind. (1959), 54. Absorption peaks at 8.22 microns (1218 cm.$^{-1}$) and 12.67 microns (790 cm.$^{-1}$) are used for estimation of the amounts of trimeric and tetrameric phosphonitrilic chlorides respectively in a carbon disulfide solution of the mixture of cyclic polymers, the proportions varying with the respective peak heights at these wavelengths. The proportion of higher cyclic polymers then follows by difference or by similar correlation with peak heights at the appropriate wavelengths.

The accuracy of the method is demonstrated in the following table which compares measured compositions with actual compositions of synthetic mixtures of polymers.

TABLE I

| Sample No. | | Percent composition of mixture of $(PNCl_2)_n$ | | |
|---|---|---|---|---|
| | $n=$ | 3 | 4 | >5 (by difference) |
| I | Actual | 44 | 15 | 41 |
| | Found | 45 | 14 | 41 |
| II | Actual | 41 | 18 | 41 |
| | Found | 40 | 16 | 44 |
| III | Actual | 27 | 12 | 61 |
| | Found | 26.5 | 12 | 61.5 |

To prove further the method, an infra-red analysis of a mixture of cyclic polymers produced in the reaction between phosphorus pentachloride and ammonium chloride by the technique of the present invention, was compared with the results of actual separation of the trimeric phosphonitrilic chloride by the acid extraction technique and analysis of residues. The two results for the proportion of the trimer in the crude product were:

Infra-red analysis 48%; acid extraction 51%

Finally, infra-red analysis of separated trimer/tetramer mixtures agrees with analysis by the melting point/composition diagram for the two polymers, as the following figures demonstrate:

TABLE II

| | Percent composition $(PNCL_2)_n$ | | | |
|---|---|---|---|---|
| | By infra-red | | By m.p.t. | |
| | $n=3$ | $n=4$ | $n=3$ | $n=4$ |
| A | 81 | 81 | 18 | 19 |
| B | 79 | 22 | 78 | 22 |

EXAMPLE 1

62.5 g. (0.3 mole) of phosphorus pentachloride and 176.5 g. (3.3 moles) of ammonium chloride were placed in 1.0 liter of symmetrical tetrachloro-ethane in a still-pot fitted with reflux condenser. This reactant mixture was then heated by means of an oil bath to the boiling point of the solvent. The refluxing solvent was passed continuously through 563 g. (2.7 moles) (i.e. 90% of the total quantity used in the reaction) of phosphorus pentachloride at a temperature of between 80 degrees C. and 100 degrees C. before being returned to the still-pot. The bed of phosphorus pentachloride was thus extracted into the still-pot in a time of 6 hours, while the total reaction time was 7½ hours. Thus, the phosphorus pentachloride was added during 80 percent of the total reaction time. After filtration and removal of the solvent a 92.6% yield (322 g.) of crude product was obtained, containing phosphonitrilic chloride polymers in the following yields based on phosphorus pentachloride used:

5% linear end-blocked polymers.
50% trimeric phosphonitrilic chloride.
11% tetrameric phosphonitrilic chloride.
27% $(PNCl_2)_n$, ($n=5$ or more).

EXAMPLE 2

563 g. (2.7 moles) of phosphorus pentachloride was dissolved in 1.0 liter of symmetrical tetrachloroethane at approximately 100 degrees C. and this solution was added gradually over a period of 8 hours to a mixture of 176.5 g. (3.3 moles) of ammonium chloride plus 62.5 g. (0.3 mole) of phosphorus pentachloride and 1.0 liter of refluxing symmetrical tetrachloroethane. The total reaction time was 10½ hours. Thus, the phosphorus pentachloride was added during 76 percent, that is, about 75 percent of the total reaction time. After filtration and removal of the solvent, 94.2% yield (328 g.) of the crude product was obtained containing phosphonitrilic chloride polymers in the following yields based on phosphorus pentachloride used:

1.5% linear end-blocked polymers.
61% trimeric phosphonitrilic chloride.
13% tetrameric phosphonitrilic chloride.
19% $(PNCl_2)_n$, ($n=5$ or more).

The amount of HCl evolved was measured from time to time and plotted as the chain line in the graph reproduced in FIG. 1 of the accompanying drawings. The smoothed curve representing $PCl_5$ addition is denoted by the full line in the graph. The abscissae represent time in minutes and the ordinates the percentage of the total of $PCl_5$ added or HCl evolved. The rate of HCl evolution is dependent on the rate of $PCl_5$ addition and the rate in terms of percentage of the theoretical rate of HCl evolution is given in the following table:

| Reaction time period in mins. | Percent total $PCl_5$ added | Percent total HCl evolved | Average rate of addition of $PCl_5$ percent minute | Average rate of HCl evolution percent minute | Rate of HCl evolution as percent of theoretical rate |
|---|---|---|---|---|---|
| 0–100 | 26 | 21.5 | 0.26 | 0.215 | 83 |
| 0–200 | 42 | 39.5 | 0.21 | 0.20 | 94 |
| 0–300 | 58 | 55.5 | 0.193 | 0.185 | 96 |
| 0–400 | 78 | 72.5 | 0.195 | 0.181 | 93 |
| 0–500 | 98 | 83 | 0.196 | 0.166 | 85 |

EXAMPLE 3

626 g. (3.0 moles) of phosphorus pentachloride was dissolved in 1.0 liter of phosphorus oxychloride. This solution was added gradually over 10¼ hours to a mixture of 176 g. (3.3 moles) of finely divided ammonium chloride ground in a ball mill in the solvent for 17 hours and 4 g. of zinc chloride acting as a catalyst, with 100 cc. of phosphorus oxychloride. The reaction was then continued for a further 1½ hours. The extent of the reaction as determined by the quantity of hydrogen chloride evolved was 99.8%. After filtration and removal of the solvent, a 99% yield (345 g.) of the crude product was obtained containing phosphonitrilic chloride polymers in the following yields based on phosphorus pentachloride used:

7% linear end-blocked polymers.
52.5% trimeric phosphonitrilic chloride.
8% tetrameric phosphonitrilic chloride.
30% $PNCl_2)_n$, ($n=5$ or more).

EXAMPLE 4

214 g. (4.0 moles) ammonium chloride was ground in 500 mls. monochlorobenzene in a ball-mill for 4 hours after which time its specific surface was approximately 3500 sq.cms./gm. The ammonium chloride slurry was then transferred to a reaction flask fitted with reflux condenser, HCl absorption system and dropping funnel for addition of phosphorus pentachloride solution. While this slurry was refluxed on an oil bath a solution of 4.7 g. (2.0 moles) phosphorus pentachloride in 1200 mls. monochlorobenzene was added steadily in 15 equal increments. The amount of HCl evolved was measured from time to time and plotted as the chain line in the graph reproduced in FIG. 2 of the accompanying drawings. The smoothed curve representing $PCl_5$ addition is denoted by the full line in the graph. The abscissae represent time in minutes and the ordinates the percentage of the total of $PCl_5$ added or HCl evolved. The rate of HCl evolution is dependent on the rate of $PCl_5$ addition and the rate in terms of percentage of the theoretical rate of HCl evolution is given in the following table:

TABLE IV

| Reaction time period n mins. | Percent total PCl₅ added | Percent total HCl evolved | Average rate of addition of PCl₅ percent minute | Average rate of HCl evolution percent minute | Rate of HCl evolution as percent of theoretical rate |
|---|---|---|---|---|---|
| 0-25 | 26.7 | 10.5 | 1.05 | 0.42 | 40 |
| 0-50 | 46.7 | 26.5 | 0.93 | 0.53 | 57 |
| 0-75 | 73.3 | 43.5 | 0.98 | 0.58 | 59 |
| 0-100 | 100.0 | 61 | 1.0 | 0.61 | 61 |

The phosphorus pentachloride was added over a period of 1¾ hours. Reaction, as determined by the evolution of hydrogen chloride was complete in approximately 3½ hours, yielding 217 g. (93.5% theory) of crude product. Yields of individual components of this mixture based on phosphorus pentachloride used were as follows:

1.8% linear end-blocked polymers.
56.5% trimeric phosphonitrilic chloride.
6% tetrameric phosphonitrilic chloride.
29% (PNCl₂)ₙ, (n=5 or more).

EXAMPLE 5

250 g. (4.67 moles) ammonium chloride were suspended in 0.7 liter symmetrical tetrachloroethane and ball-milled for 4 hours, after which time its specific surface was 3000–3500 sq. cm./gm. The resultant slurry was transferred with washing with a further 0.25 liter solvent to a reaction flask and 17 g. (0.71 gm. atoms) magnesium metal added as catalyst. The mixture was heated to reflux on an oil bath and to it was added at 7 minute intervals 100 ml. portions of a solution of 422 g. (2.03 moles) phosphorus pentachloride in 1.25 liters symmetrical tetrachloroethane. The amount of HCl evolved was measured from time to time and plotted as the chain line in the graph reproduced in FIG. 3 of the accompanying drawings. The smoothed curve representing PCl₅ addition is denoted by the full line in the graph. The abscissae represent time in minutes and the ordinates the percentage of the total of PCl₅ added or HCl evolved. The rate of HCl evolution is dependant on the rate of PCl₅ addition and the rate in terms of percentage of the theoretical rate of HCl evolution is given in the following table:

TABLE V

| Reaction time period in mins. | Percent total PCl₅ added | Percent total HCl evolved | Average rate of addition of PCl₅ percent minute | Average rate of HCl evolution percent minute | Rate of HCl evolution as percent of theoretical rate |
|---|---|---|---|---|---|
| 0-25 | 25.7 | 22.2 | 1.03 | 0.89 | 86 |
| 0-50 | 51.5 | 46.0 | 1.03 | 0.92 | 89 |
| 0-75 | 71.0 | 68.0 | 0.95 | 0.91 | 96 |
| 0-106 | 100.0 | 96.5 | 0.95 | 0.91 | 96 |

The yield of trimeric phosphonitrilic chloride obtained was 59.5% based on the phosphorus pentachloride used.

The following table shows yield data by way of comparison between the present invention and certain prior proposals hereinbefore referred to. All the yields are percentages of theoretical based on the phosphorus pentachloride used.

TABLE VI

| Process | NH₄Cl + PCl₅ batch reaction (Schenk & Romer) | NH₄Cl + PCl₅ slow addition PCl₅ (present invention) | NH₄Cl + PCl₅ quinoline catalyst | NH₃(liq) + PCl slow addition PCl₅ |
|---|---|---|---|---|
| Yield phosphonitrilic chlorides cyclic and linear. | 94-98 | 93-99 | Unknown (product contaminated by quinoline hydrochloride). | Impossible to determine since product contaminated by amidated products. |
| Yield cyclic polymers | 75-85 | 88-92 | 77 (max.) | |
| Yield linear polymers | 15-25 | 2-7 | 45 (product contaminated). | |
| Yield trimeric phosphonitrilic chloride. | 25-35 | 50-65 | 29 | 2.2 (max.). |
| Yield tetrameric phosphonitrilic chloride. | 10-20 | 6-13 | 11 | Extremely small. |

We claim:

1. A process for the production of cyclic phosphonitrilic chloride polymers which comprises reacting phosphorus pentachloride and ammonium chloride in a hot inert solvent therefor, wherein 90 to 100 percent of the phosphorus pentachloride is added slowly and evenly over a period in the range from 76 percent of the time to substantially the total time during which the reaction takes place.

2. A process according to claim 1 wherein the phosphorus pentachloride is added in solution in a hot inert solvent.

3. A process according to claim 2 wherein the solvent is symmetrical tetrachloroethane.

References Cited
UNITED STATES PATENTS
3,347,643  10/1967  Nielsen _____ 23—357

OSCAR R. VERTIZ, Primary Examiner

H. S. MILLER, Assistant Examiner

UNITED STATES PATENT OFFICE
CERTIFICATE OF CORRECTION

Patent No. 3,667,922  Dated June 6, 1972

Inventor(s) James E. Proctor, Norman L. Paddock, Harold T. Searle

It is certified that error appears in the above-identified patent and that said Letters Patent are hereby corrected as shown below:

Column 5, in Table II, at lines 34-40, over the first column read the heading "Sample"; for line 39, read "A.......... 81  18  81  19".

Column 6, line 24, over the table read the heading "TABLE III"; and at line 54, for "PNCl$_2$)$_n$" read "(PNCl$_2$)$_n$".

Column 7, in Table IV, in the heading above the first column, for "n mins." read "in mins."; in the headings above the fourth and fifth columns, for "percent minute" read "percent per minute".

Column 8, in Table VI, in the heading above the fifth column, for "PCl" read "PCl$_5$".

Signed and sealed this 27th day of March 1973.

(SEAL)
Attest:

EDWARD M. FLETCHER, JR.
Attesting Officer

ROBERT GOTTSCHALK
Commissioner of Patents